(12) United States Patent
Zhou et al.

(10) Patent No.: US 11,423,767 B2
(45) Date of Patent: Aug. 23, 2022

(54) EARLY WARNING METHOD AND DEVICE OF STAYING IN VEHICLE, AND COMPUTER READABLE STORAGE MEDIUM

(71) Applicant: Guangzhou Automobile Group Co., Ltd., Guangdong (CN)

(72) Inventors: Xiaofeng Zhou, Guangdong (CN); Guangwei Ran, Guangdong (CN); Weiliang Luo, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 146 days.

(21) Appl. No.: 16/319,482

(22) PCT Filed: Jul. 11, 2018

(86) PCT No.: PCT/CN2018/095234
§ 371 (c)(1),
(2) Date: Jan. 22, 2019

(87) PCT Pub. No.: WO2019/095707
PCT Pub. Date: May 23, 2019

(65) Prior Publication Data
US 2021/0350694 A1    Nov. 11, 2021

(30) Foreign Application Priority Data
Nov. 16, 2017   (CN) .......................... 201711141219.3

(51) Int. Cl.
*B60R 25/00* (2013.01)
*G08B 29/18* (2006.01)
(Continued)

(52) U.S. Cl.
CPC ........ *G08B 29/185* (2013.01); *B60R 25/1004* (2013.01); *B60R 25/31* (2013.01); *B60R 25/34* (2013.01); *G08B 21/22* (2013.01)

(58) Field of Classification Search
CPC .... G08B 29/185; G08B 21/22; G08B 21/182; G08B 21/24; B60R 25/1004; B60R 25/31;
(Continued)

(56) References Cited

U.S. PATENT DOCUMENTS

| 7,170,401 | B1 * | 1/2007 | Cole ....................... B60R 25/10 |
| | | | 340/439 |
| 2017/0232887 | A1 * | 8/2017 | Clontz ................... B60Q 5/005 |
| | | | 340/457 |
| 2018/0265020 | A1 * | 9/2018 | Aoyagi ................... B60R 25/24 |

FOREIGN PATENT DOCUMENTS

| CN | 202863370 U | 4/2013 |
| CN | 103287332 A | 9/2013 |

(Continued)

*Primary Examiner* — Ojiako K Nwugo
(74) *Attorney, Agent, or Firm* — ScienBiziP, P.C.

(57) ABSTRACT

Provided is an early warning method of trapping in a vehicle. The early warning method includes: a current bearing value of a seat is stored as an initial value when unlocking of a vehicle door is detected, a weight difference is obtained by performing a subtraction operation between the current bearing value of the seat and the initial value when locking of the vehicle door is detected, and a trapping alarm signal is given when the weight difference is greater than or equal to a preset first weight threshold. An early warning device of trapping in a vehicle and a computer readable storage medium are further provided. With the adoption of the embodiment of the present disclosure, a false alarm as a result of the article fixed on the seat of the vehicle in the conventional art may be effectively solved, and an early warning for the child or the pet staying in the vehicle may be effectively implemented at the same time.

18 Claims, 3 Drawing Sheets

(51) Int. Cl.
*B60R 25/10* (2013.01)
*B60R 25/31* (2013.01)
*B60R 25/34* (2013.01)
*G08B 21/22* (2006.01)

(58) Field of Classification Search
CPC ......... B60R 25/34; B60R 16/03; B60R 25/24; B60R 21/02; G07C 5/10; B60N 2/00; B60Q 9/00
See application file for complete search history.

(56) References Cited

FOREIGN PATENT DOCUMENTS

| | | |
|---|---|---|
| CN | 104670124 A | 6/2015 |
| CN | 104732711 A | 6/2015 |
| CN | 105818715 A | 8/2016 |
| CN | 105946770 A | 9/2016 |
| CN | 205871982 U | 1/2017 |
| CN | 107323407 A | 11/2017 |

* cited by examiner

EARLY WARNING METHOD AND DEVICE OF STAYING IN VEHICLE, AND COMPUTER READABLE STORAGE MEDIUM

TECHNICAL FIELD

The present disclosure relates to the technical field of automobile electronics, in particular to an early warning method and device of trapping in a vehicle, and a computer readable storage medium.

BACKGROUND

Along with the rapid development of an automobile industry and the improvement of people's living standard, automobiles have become popular in every household. However, as the rapid development of the automobile industry in China, safety problem due to using of the automobile has been increasing day by day, for example a child staying in the car. These children are subjected to irreversible damage or even lose their lives due to staying in the car as a result of negligence of a driver ultimately. Therefore, the safety problem of the child staying in the car has received more and more attention.

A conventional art discloses a seat detecting device of preventing a child from staying. The device is characterized in that a cushion of a seat of a vehicle is provided with a weight sensor. When the driver locks a vehicle door after parking and if a pressure of 1 kg and above is arranged on the cushion of the seat, a sound-light alarm is given through a remote control key, so as to prompt the driver to check the vehicle. In this way, an early warning for the children staying in the car may be implemented.

The mentioned seat detecting device of preventing the child from staying may effectively prevent the child or a pet from staying in the car. However, if a fixed article is always placed on the seat of the automobile, for example, a child safety seat, an alarm may occur when the driver locks the vehicle door after parking every time. The occurred alarm is a false alarm due to the article which is fixed on the seat of the car rather than the child or the pet staying in the car, and this is the last thing that the driver wants to see.

SUMMARY

The technical problem to be solved by the present disclosure is to provide an early warning method and device of trapping in a vehicle, and a computer readable storage medium. The early warning method and device may effectively solve a false alarm as a result of an article which is fixed in the vehicle in the conventional art while effectively implementing an early warning for a child or a pet staying in the vehicle.

A first aspect of an embodiment of the present disclosure provides an early warning method of trapping in a vehicle. The method includes the following steps: a current bearing value of a seat is stored as an initial value when unlocking of a vehicle door is detected; the weight difference is obtained by performing a subtraction operation between the current bearing value of the seat and the initial value when locking of the vehicle door is detected; a trapping alarm signal is given when the weight difference is greater than or equal to a preset first weight threshold.

In an embodiment, the step that the current bearing value of the seat is stored as the initial value when the unlocking of the vehicle door is detected specifically includes: when the unlocking of the vehicle door is detected under a state that an engine of the vehicle is stopped and a water temperature of the engine of the vehicle is not more than a preset temperature, the current bearing value of the seat is stored as the initial value.

In an embodiment, the step that the weight difference is obtained by performing the subtraction operation between the current bearing value of the seat and the initial value when the locking of the vehicle door is detected specifically includes: when the locking of the vehicle door is detected under the state that a flameout instruction for controlling the engine of the vehicle to implement a flameout operation is received, or under the state that the engine of the vehicle is stopped and the water temperature of the engine is greater than the preset temperature, then the weight difference is obtained by performing the subtraction operation between the current bearing value of the seat and the initial value.

In an embodiment, the method further includes: when the vehicle is in a static state, a decrease of the bearing value of the seat is detected and a decreased number is greater than or equal to a second weight threshold, the initial value is renewed according to a change of the bearing value of the seat within a subsequent preset time period.

In an embodiment, the step that the initial value is renewed according to the change of the bearing value of the seat within the subsequent preset time period when the vehicle is in the static, state, the decrease of the bearing value of the seat is detected, and the decreased number is greater than or equal to the second weight threshold includes the following, steps:

when the vehicle is in the static state, the decrease of the bearing value of the seat is detected and the decreased number is greater than or equal to the second weight threshold, whether the bearing value of the seat is maintained unchanged within the subsequent preset time period is judged; and when the bearing value of the seat is maintained unchanged within the preset time period The bearing value of the seat within the preset time period is stored as a new initial value, so as to renew the initial value.

In an embodiment, the method further includes the following steps: when the vehicle is in the static state, the decrease of the bearing value of the seat is detected, and the decreased number is greater than or equal to the second weight threshold, the driver is prompted that the initial value will be updated and the bearing value of the seat should not be changed within the preset time period; the driver is informed of successful renewal of the initial value and a specific number of the initial value after the renewal when the initial value is renewed successfully.

In an embodiment, the method further includes the following steps: when the unlocking or locking of the vehicle door is detected upon sending the trapping alarm signal, stop sending the trapping alarm signal.

A second aspect of the embodiment of the present disclosure provides an early warning device of trapping in a vehicle. The early warning device includes a processor, a memory and a computer program which is stored in the memory and configured to be implemented by the processor. The processor implements the early warning method of staying in the vehicle mentioned in the embodiment of the present disclosure when implementing the computer program.

A third aspect of the embodiment of the present disclosure provides a computer readable storage medium. The computer readable storage medium includes a stored computer program. Herein, a device where the computer readable storage medium is located is controlled to implement the early warning method of staying in the vehicle mentioned in the embodiment of the present disclosure when the computer program runs.

Compared with the conventional art, the beneficial effects of the embodiment of the present disclosure are: the early warning method and device of staying in the vehicle and the computer readable storage medium disclosed in the embodiment of the present disclosure may include: the current bearing value of the seat is stored as the initial value when the unlocking of the vehicle door is detected, the weight difference is obtained by performing the subtraction operation between the current bearing value of the seat and the initial value when locking of the vehicle door is detected, and the trapping alarm signal is given when the weight difference is greater than or equal to the preset first weight threshold. Through the mentioned method, the false alarm as a result of the article fixed on the seat of the vehicle in the conventional art may be effectively solved, the early warning for the child or the pet staying in the vehicle may be effectively implemented at the same time, and accordingly potential safety hazards, such as high temperature, hypoxia and asphyxia of the child or the pet due to staying in the vehicle for a long time may be avoided.

DETAILED DESCRIPTION OF THE EMBODIMENTS

The technical solutions in embodiments of the present disclosure will be clearly and completely described below in combination with drawings in the embodiments of the present disclosure. It is apparent that the described embodiments are not all embodiments but part of the embodiments of the present disclosure. All other embodiments obtained by those of ordinary skill in the art on the basis of the embodiments in the present disclosure without creative work shall fall within the scope of protection of the present disclosure.

Figure 1:
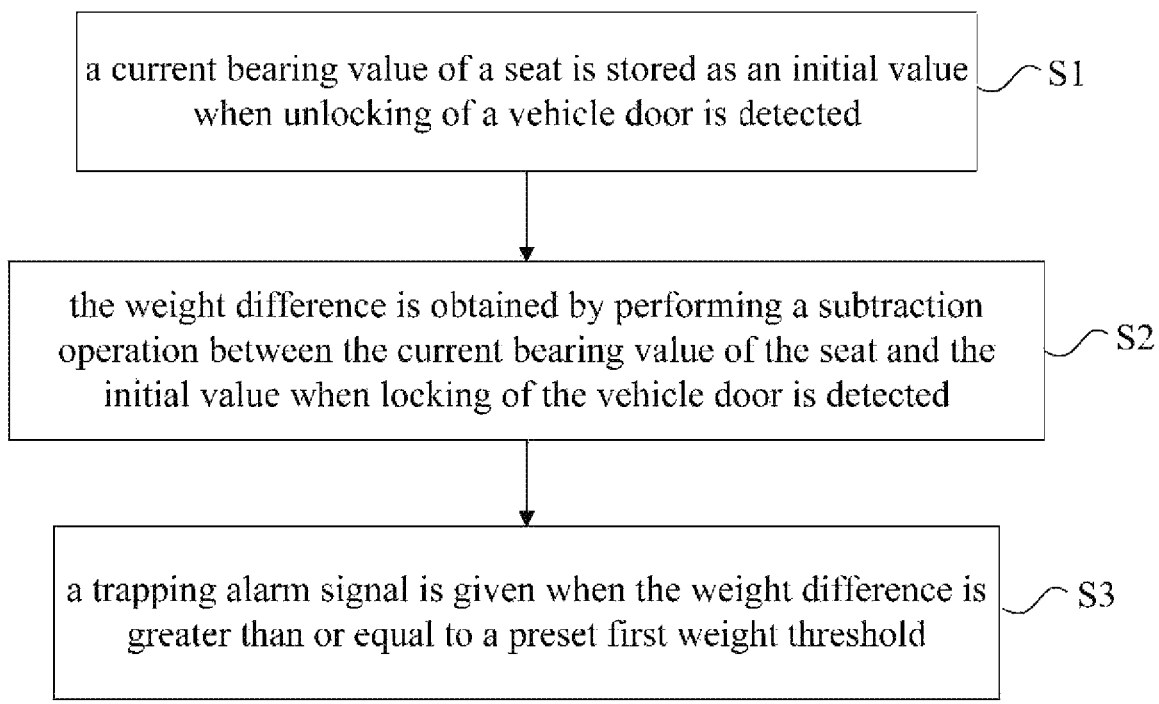
FIG. 1 is a process diagram of an early warning method of trapping in a vehicle provided by an embodiment of the present disclosure.

FIG. 1 shows a process diagram of an early warning method of trapping in a vehicle provided by an embodiment of the present disclosure. The method includes the following steps.

S1, a current bearing value of a seat is stored as an initial value when unlocking of a vehicle door is detected.

S2, a weight difference is obtained by performing a subtraction operation between the current bearing value of the seat and the initial value when locking of the vehicle door is detected.

S3, a trapping alarm signal is given when the weight difference is greater than or equal to a preset first weight threshold.

In the embodiment, the current bearing value of the seat is specifically obtained in real time through a weight sensor which is arranged on the seat.

Herein, the first weight threshold may be set, but, is not limited, to 3 kg. Herein, the first weight threshold is set to 3 kg because weights of most of newborns or pets are 3 kg and above. In this way, a false alarm of a staying early warning due to other non-child or non-pet articles which are less than 3 kg may be avoided effectively.

In an alternative embodiment, the step S1 specifically includes: the current bearing value of the seat is stored as the initial value when the unlocking of the vehicle door is detected under a first parking state, and the first parking state is used to indicate the parking state corresponding to a get-on process.

The first parking state specifically relates to: an engine of the vehicle is stopped and a water temperature of the engine of the vehicle is not greater than a preset temperature, preferably the engine of the vehicle is stopped and stopped continuously for at least a first preset time. Herein, the current bearing value of the seat is set as the initial value on the premise that the unlocking of the vehicle door is detected only when the engine of the vehicle is stopped and the water temperature of the engine of the vehicle is not more than the preset temperature. In this way, a change of the initial value due to the child or the pet on the seat may be avoided when the vehicle is stopped temporarily within a short time, namely normal sending of the trapping alarm signal is influenced due to error calculation of the weight difference as a result of the change of the initial value because the weight of the child or the pet on the seat is taken as a new initial value. Herein, the preset temperature is the temperature of cooling water when the engine of the vehicle runs normally.

In an alternative embodiment, the step S2 specifically includes: the weight difference is obtained by performing the subtraction operation between the current bearing value of the seat and the initial value when the locking of the vehicle door is detected under a second parking state. The second parking state is used to indicate the parking state corresponding to a get-off process.

The second parking state specifically relates to: a flameout instruction for controlling the engine of the vehicle to implement a flameout operation is received, or the engine of the vehicle is stopped and the water temperature of the engine is greater than the preset temperature.

In the embodiment of the present disclosure, the vehicle is in the first parking state during a get-on process, and the current bearing value of the seat is acquired and stored as the initial value when the unlocking of the vehicle door is detected. While the vehicle is in the second parking state during the get-off process, and the current bearing value of the seat is acquired again when the locking of the vehicle door is detected. The weight difference is obtained by acquiring the bearing value of the seat during the get-on process and the bearing value of the seat during the get-off process and subtracting the bearing value of the seat during the get-on process from the bearing value of the seat during the get-off process. Suppose that the two acquired bearing values are different, namely the weight difference is not 0, the change of the bearing state of the seat may be judged, and the child or the pet may be left on the seat. One first weight threshold is preset, and the child or the pet on the seat may be judged when the weight difference is greater than or equal to the first weight threshold. The trapping alarm signal may be given to prompt the driver to implement safety inspection, so as to prevent the child or the pet from being left in the vehicle. In addition, that whether to give the trapping alarm signal is judged on the premise of comparison of the weight difference and the first weight threshold, while the article fixed on the seat of the vehicle may not influence the weight different. Accordingly, the false alarm as a result of the article fixed on the seat of the vehicle in the conventional art may be avoided.

The embodiment of the present disclosure includes the following two circumstances that the vehicle gives the trapping alarm signal as a result of a weight which is placed. The two circumstances are specifically elaborated as follows:

Circumstance 1: under the parking state, suppose that no article is placed on the seat of the vehicle originally, the current bearing value of the seat is taken the initial value when the unlocking of the vehicle door is detected, namely the initial value is 0. The driver, after unlocking the vehicle door and placing the weight on the seat (suppose that a mass of the weight is 3 kg), directly leaves the vehicle rather than starts the engine. When the locking of the vehicle door is detected, the bearing value of the seat is the mass 3 kg of the weight, and the vehicle gives the trapping alarm signal when the driver gets off the vehicle because the weight difference obtained by subtracting the initial value from the bearing value of the seat is greater than or equal to the preset first weight threshold 3 kg. The driver may control the vehicle with a radio smart key to stop sending the trapping alarm signal, and leave the weight on the seat.

Circumstance 2: under the parking state, suppose that no article is placed on the seat of the vehicle originally, the current bearing value of the seat is taken the initial value when the unlocking of the vehicle door is detected, namely the initial value is 0. The driver, after unlocking the vehicle door and placing the weight on the seat (suppose that the mass of the weight is 3 kg), gets off the vehicle after driving the vehicle for a distance. When the locking of the vehicle door is detected, the bearing value of the seat is the mass 3 kg of the weight, and the vehicle gives the trapping alarm signal when the driver gets off the vehicle because the weight difference obtained by subtracting the initial value from the bearing value of the seat is greater than or equal to the preset first weight threshold 3 kg. The driver may take off the weight after opening the vehicle door again, or control the vehicle with the radio smart key to stop sending the trapping alarm signal, and leave the weight on the seat.

In an embodiment, the method further includes the following steps.

The initial value is renewed according to the change of the bearing value of the seat within the subsequent preset time period when the vehicle is in a static state, a decrease of the bearing value of the seat is detected, and a decreased number is greater than or equal to a second weight threshold.

Herein, the second weight threshold may be set, but is not limited, to 1 kg.

In an alternative embodiment, the step that the initial value is renewed according to the change of the bearing value of the seat within the subsequent preset time period when the vehicle is in the static state, the decrease of the bearing value of the seat is detected, and the decreased number is greater than or equal to the second weight threshold includes the following steps.

That whether the bearing value of the seat is maintained unchanged within the subsequent preset time period is judged when the vehicle is in the static state, the decrease of the bearing value of the seat is detected, and the decreased number is greater than or equal to the second weight threshold. Herein, that the bearing value of the seat is maintained unchanged means that a proportion of change of the bearing value is within a certain scope, for example, within 1-3%, and the specific proportion of change may be the number that a user defines.

The bearing value of the seat within the preset time period is stored as a new initial value, so as to renew the initial value when the bearing value of the seat is maintained unchanged within the preset time period.

Suppose that the weight of 1 kg is placed on the seat originally under the parking state, the mass 1 kg of the current weight on the seat may be stored as the initial value when the driver opens the vehicle door and prepares to get on the vehicle. If the driver moves the weight away at the moment, and places the child or the pet on the seat (suppose that the mass of the child or the pet is 3 kg), the driver gets off after driving the vehicle for a distance in this state. When the driver gets off the vehicle, the bearing value of the seat is the mass 3 kg of the child or the pet when the locking of the vehicle door is detected and the initial value is the mass 1 kg of the weight placed on the seat, originally, accordingly the weight difference is 2 kg which is not greater than or equal to the preset first weight threshold 3 kg. In this way, the serious consequence may be caused due to the problem that the child or the pet may stay on the seat when the driver gets off the vehicle, however the vehicle does not give the alarm signal.

In order to solve the mentioned problem, in the embodiment, the initial value is renewed upon moving the weight away when the decease of the bearing value of the seat is detected, the decreased number is greater than or equal to the second weight threshold 1 kg and the change of the bearing value of the seat tends to be stable within the subsequent preset time period. Accordingly, the initial value may be ensured to be renewed to 0 timely when the weight is moved away. At the moment, the child or the pet of 3 kg is placed on the seat from which the weight is moved, and the weight difference may not be influenced by the weight which is moved away when the driver gets off the vehicle and the locking of the vehicle door is detected because the initial value is renewed to 0 and the weight difference is 3 kg. At the moment, the weight difference is greater than or equal to the first weight threshold 3 kg, and accordingly the trapping alarm signal may be sent normally.

Herein, the static state means the state with a speed of 0, or may be the state in which the vehicle is stopped completely, or the state in which the vehicle is stopped temporarily, however the engine still runs.

In an embodiment, the method further includes the following steps.

A driver is prompted that the initial value will be updated and the bearing value of the seat should not be changed within the preset time period when the decrease of the bearing value of, the seat is detected under the static state of the vehicle, and the decreased number is greater than or equal to the second weight threshold.

The driver is informed of successful renewal of the initial value and a specific number of the initial value after the renewal when the initial value is renewed successfully.

Herein, the preset time may be set, but is not limited, to 30 s. The vehicle may be controlled to give a voice prompt to prompt the driver that renewal of the initial value is implemented soon and the bearing value of the seat should not be changed within the preset time period. In addition, when the initial value is renewed successfully, the vehicle may be controlled again to give the voice prompt to inform the driver of successful renewal of the initial value and the specific number of the initial value after the renewal. Herein, a vehicle-mounted audio entertainment module which is arranged in the vehicle controls to send the voice prompt.

In an embodiment, the method further includes the following steps.

The vehicle is controlled to send the trapping alarm signal when the unlocking or locking of the vehicle door is detected upon sending the trapping alarm signal.

Herein, the driver may unlock again if the trapping alarm signal is given as a result of the weight which is placed on the seat of the vehicle, to open the vehicle door and take out the weight, or stop sending the trapping alarm signal with the radio smart key and leave the weight on the seat.

In an embodiment, the method further includes the following steps.

That the unlocking of the vehicle door is detected is judged when a vehicle door unlocking signal sent by the radio smart key is acquired.

That the locking of the vehicle door is detected is judged when the vehicle door locking signal sent by the radio smart key is acquired.

Herein, the radio smart key is part of a Passive Entry Passive Start (PEPS) module. The drive takes along the radio smart key outside the vehicle, and the PEPS module may automatically search the effective radio smart key when the driver presses a button of a handle of the vehicle door. The PEPS module may control the vehicle door to implement automatic unlocking or locking when the effective radio smart key is searched. Furthermore, the vehicle door may be unlocked and locked by pressing a "Lock" button or an "Unlock" button of the radio smart key.

The embodiment of the present disclosure further provides an early warning device of trapping in a vehicle. The early warning device of staying in the vehicle in the embodiment includes a processor, a memory and a computer program which is stored in the memory and may run on the processor. The processor implements the steps in the mentioned embodiment of the early warning method of staying in the vehicle when implementing the computer program, namely steps S1-S3 as shown in FIG. 1.

It is exemplary that the computer program may be divided into one or multiple modules/units which are stored in the memory and implemented by the processor, so as to complete the present disclosure. The one or multiple modules/units may be a series of computer program instruction segments which may complete specific functions. The instruction segment may be taken to describe an implementation process of the computer program in the early warning device of staying in the vehicle.

The early warning device of staying in the vehicle may be a calculating device, such as a desk computer, a notebook computer, a palmtop computer and a cloud server. The early warning device of staying in the vehicle may include, but is not limited to, the processor and the memory. Those skilled in the art may understand that the process diagram is an example of the early warning device of staying in the vehicle only and not intended to limit the early warning device of staying in the vehicle. Parts which are more or less than those shown, or a combination of certain parts, or different parts may be included, for example, the early warning device of staying in the vehicle may further include an input-output device, a network access device, a bus, and so on.

The processor may be a Central Processing Unit (CPU), or other general-purpose processors, Digital Signal Processors (DSP), Application Specific Integrated Circuits (ASIC), Field-Programmable Gate Arrays (FPGA), or other programmable logic devices, discrete gate or transistor logic devices, discrete hardware components and so on. The general-purpose processor may be a microprocessor or the processor may be any conventional processor as well. The processor is a control center of the early warning device of staying in the vehicle and connected with all parts of the whole early warning device of staying in the vehicle with various interface and lines.

The memory may be used to store the computer program and/or the modules. The processor may implement various functions of the early warning device of staying in the vehicle by running or implementing the computer program and/or the module in the memory and calling data which is stored in the memory. The memory may mainly include a program storage area and a data storage area. Herein, the program storage area may store an operating system, an application (such as function of playing a sound and an image) required by at least one function, and so on. The data storage area may store the data (such as audio data and a telephone book) created according to use of a mobile phone, and so on. In addition, the memory may include a high-speed random access memory, and further include a nonvolatile memory, such as a hard disk, a memory, a plug-in type hard disk, a Smart Media Card (SMC), a Secure Digital (SD) card, a flash card, at least one disk storage device, a flash memory device or other volatile solid-state storage devices.

The embodiment of the present disclosure further provides an early warning system of trapping in a vehicle. The early warning system includes an early warning device, a PEPS module, and lights, a horn, a vehicle-mounted audio entertainment module and a weight sensor which are arranged in the vehicle. Herein, the early warning device includes the mentioned early warning device of staying in the vehicle, and the PEPS module includes the mentioned radio smart key.

Figure 2:
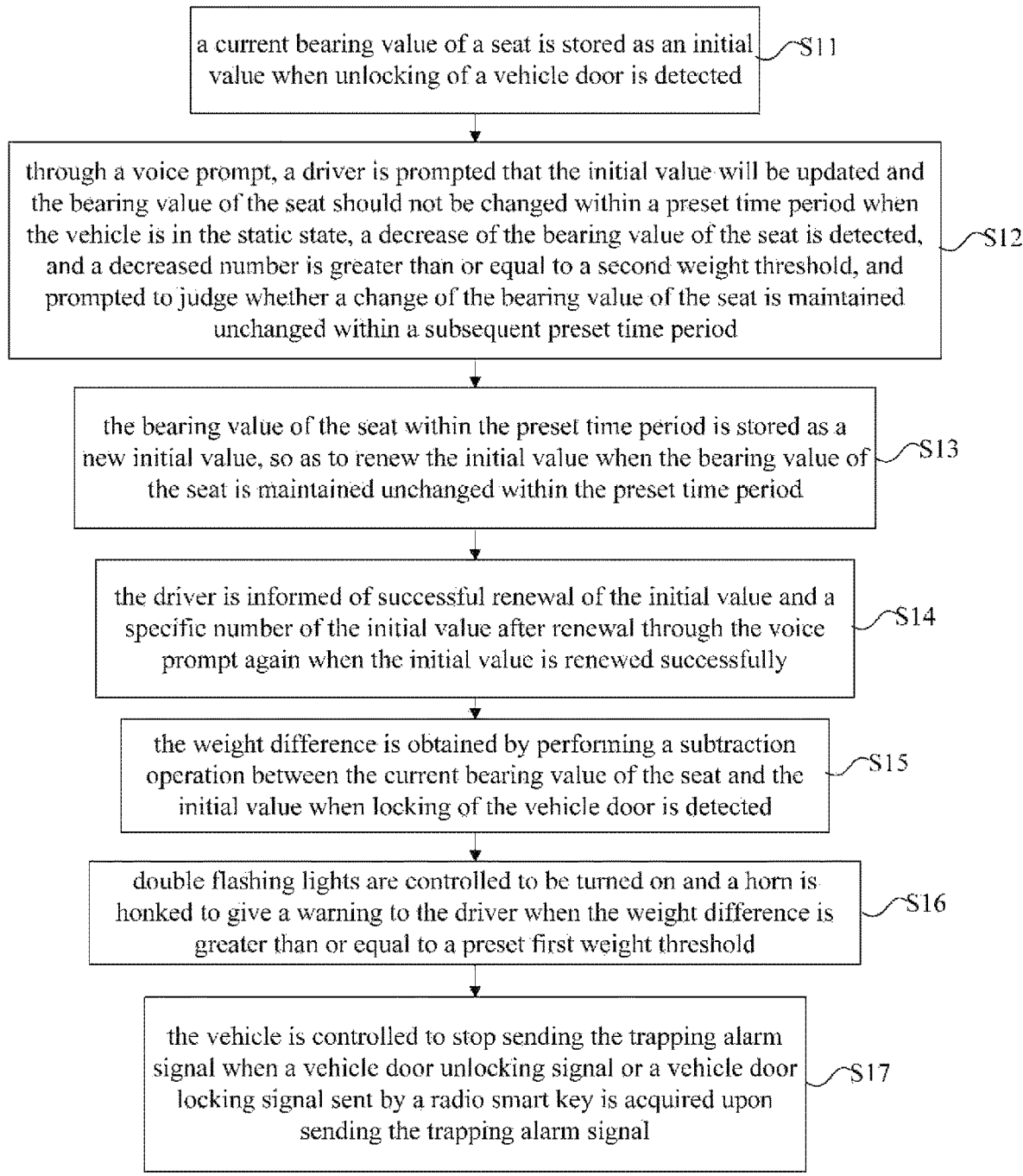
FIG. 2 is a complete process diagram of an early warning method of trapping in a vehicle provided by an embodiment of the present disclosure.
Figure 3:
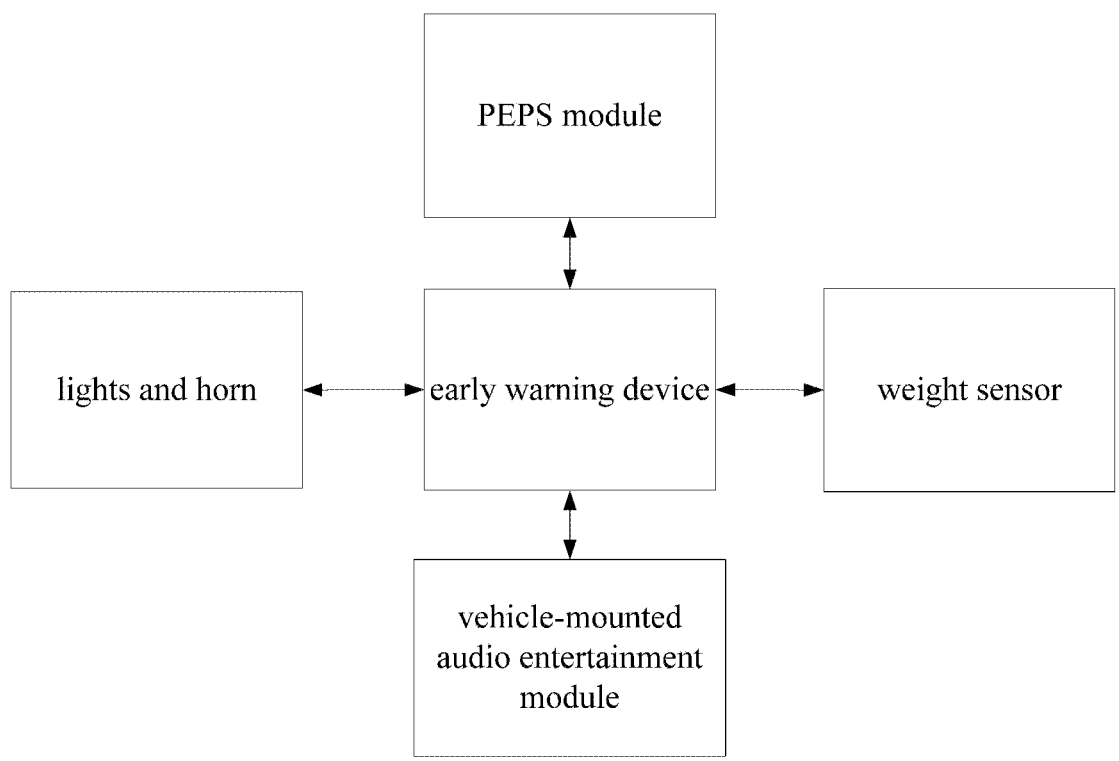
FIG. 3 is a structure diagram of an early warning system of trapping in a vehicle provided by an embodiment of the present disclosure.

A complete implementation process of the embodiment will be elaborated below by means of FIG. 2 and FIG. 3. FIG. 2 is a complete process diagram of an early warning method of trapping in a vehicle provided by the embodiment of the present disclosure. FIG. 3 is a structure diagram of an early warning system of trapping in a vehicle provided by the embodiment of the present disclosure.

The complete implementation process of the embodiment includes the following steps.

S11, a current, bearing value of a seat is stored as an initial value when unlocking of a vehicle door is detected.

S12, through a voice prompt, a driver is prompted that the initial value will be updated and the bearing value of the seat should not be changed within a preset time period when the vehicle is in the static state, a decrease of the bearing value of the seat is detected, and the decreased number is greater than or equal to a second weight threshold, and prompted to judge whether a change of the bearing value of the seat is maintained unchanged within a subsequent preset time period.

S13, the bearing value of the seat within the preset time period is stored as a new initial value, so as to renew the initial value when the bearing value of the seat is maintained unchanged within the preset time period.

S14, the driver is informed of successful renewal of the initial value and a specific number of the initial value after renewal through the voice prompt again when the initial value is renewed successfully.

S15, a weight difference is obtained by performing a subtraction operation between the current bearing value of the seat and the initial value when locking of the vehicle door is detected.

S16, double flashing lights are controlled to be turned on and a horn is honked to give a warning to the driver when the weight difference is greater than or equal to a preset first weight threshold.

S17, the vehicle is controlled to stop sending the trapping alarm signal when a vehicle door unlocking signal or a vehicle door locking signal sent by the radio smart key is acquired upon sending the trapping alarm signal.

On the basis of the implementation process, a false alarm as a result of an article fixed on the seat of the vehicle in the conventional art may be effectively solved, and an early warning for the child or the pet staying in the vehicle may be effectively implemented at the same time.

The embodiment of the present disclosure further provides a computer readable storage medium. The computer readable storage medium includes a stored computer program. Herein, a device where the computer readable storage medium is located is controlled to implement the early warning method of staying in the vehicle mentioned in the embodiment of the present disclosure when the computer program runs.

Herein, when being implemented in form of software functional unit and sold or used as an independent product, the integrated module/unit of the early warning device of staying in the vehicle may be stored in one computer readable storage medium. Based on such an understanding, all or part of the process of implementing the method in the embodiment of the present disclosure may be completed by giving an instruction to relevant hardware through the computer program. The computer program may be stored in one computer readable storage medium, and may implement the steps in all embodiments of the method when implemented by a processor. Herein, the computer program includes a computer program code which may be in form of source code, in form of object code, an executable document or other intermediate forms, and so on. The computer readable medium may include any entity or device by which the computer program code may be taken along, a recording medium, a U flash disk, a mobile hard disk, an optical disk, a computer memory, a Read-Only Memory (ROM), a Random Access Memory (RAM), a power carrier signal, a telecom signal, a software distribution medium and the like. It is to be noted that contents in the computer readable medium may be appropriately added and reduced according to the laws within the jurisdiction and requirements of the practice of a patent. For example, within certain jurisdiction, the computer readable medium may not include the power carrier signal and the telecom signal according to the laws and the practice of the patent.

It is to be noted that the embodiment of the described device is schematic only. The unit which is described as a separated part may be or may not be separated physically, and the part which is shown as the unit may be or may not be the physical unit, namely may be located at one position, or distributed in multiple network units. Part or all of the modules may be selected to implement the objective of the embodiment according to the actual need.

To sum up, the early warning method and device of staying in the vehicle and the computer readable storage medium provided by the embodiments of the present disclosure are characterized in that the method may include: the bearing value of the seat is acquired, the current bearing value of the seat is stored as the initial value when the unlocking of the vehicle door is detected, the weight difference is obtained by implement the subtraction operation between the current, bearing value of the seat and the initial value when the locking of the vehicle door is detected, and the trapping alarm signal is given when the weight difference is greater than or equal to the preset first weight threshold. With the adoption of the embodiment of the present disclosure, the false alarm as a result of the article fixed on the seat of the vehicle in the conventional art may be effectively solved, early warning for the child or the pet staying in the vehicle effectively be implemented, and accordingly potential safety hazards, such as high temperature, hypoxia and asphyxia of the child or the pet due to staying in the vehicle for a long time may be avoided.

The above is the preferred embodiment of the present disclosure. It is to be pointed out that those of ordinary skill in the art may make various improvements and modifications without departing from the theory of the present disclosure, and these improvements and modifications shall also fall within the scope of protection of the present disclosure.

What is claimed is:

1. An early warning method of trapping in a vehicle, comprising:
    obtaining a first current bearing value of a seat of the vehicle when unlocking of a vehicle door of the vehicle is detected, and storing the first current bearing value as an initial value;
    obtaining a second current bearing value of the seat when locking of the vehicle door is detected, and obtaining a weight difference by performing a subtraction operation between the second current bearing value of the seat and the initial value; and
    giving a trapping alarm signal when the weight difference is greater than or equal to a preset first weight threshold.

2. The early warning method as claimed in claim 1, wherein storing the first current bearing value of the seat as the initial value when unlocking of the vehicle door is detected comprising:
    when an engine of the vehicle is stopped and the unlocking of the vehicle door is detected under a state that a water temperature of the engine of the vehicle is not greater than a preset temperature, storing the first current bearing value of the seat as the initial value.

3. An early warning device of trapping in a vehicle, wherein the early warning device comprises a processor, a memory and a computer program which is stored in the memory and configured to be by the processor; and the processor performs the early warning method of trapping in the vehicle as claimed in claim 2 when implementing the computer program.

4. The early warning method as claimed in claim 1, wherein obtaining a weight difference by performing the subtraction operation between the second current bearing value of the seat and the initial value comprises:
    when the locking of the vehicle door is detected under the state that a flameout instruction for controlling the engine of the vehicle to perform a flameout operation is received, or under the state that the engine of the vehicle is stopped and the water temperature of the engine of the vehicle is greater than the preset temperature, obtaining the weight difference by performing the subtraction operation between the second current bearing value of the seat and the initial value.

5. An early warning device of trapping in a vehicle, wherein the early warning device comprises a processor, a memory and a computer program which is stored in the memory and configured to be by the processor; and the processor performs the early warning method of trapping in the vehicle as claimed in claim 4 when implementing the computer program.

6. The early warning, method as claimed in claim 1, wherein the method further comprises:

when the vehicle is in a static state and a decrease of the bearing value of the seat is detected, and a decreased number is greater than or equal to a second weight threshold, updating the initial value according to a change of the bearing value of the seat within a subsequent preset time period.

7. The early warning method as claimed in claim 6, wherein updating the initial value according to the change of the bearing value of the seat within the subsequent preset time period when the vehicle is in the static state, the decrease of the bearing value of the seat is detected, and the decreased number is greater than or equal to the second weight threshold comprises:
when the vehicle is in the static state, the decrease of the bearing value of the seat is detected and the decreased bearing value is greater than or equal to the second weight threshold, judging whether the bearing value of the seat is maintained unchanged within the subsequent preset time period; and
when the bearing value of the seat is maintained unchanged within the preset time period, storing the bearing value of the seat within the preset time period as a new initial value to update the initial value.

8. The early warning method as claimed in claim 7, wherein the method further comprises:
when the decrease of the bearing value of the seat is detected under the static state of the vehicle and the decreased number is greater than or equal to the second weight threshold, prompting the driver that the initial value will be updated and the bearing value of the seat should not be changed within the preset time period; and
when the initial value is updated successfully, informing the driver of successful updating of the initial value and a specific number of the initial value after the updating.

9. An early warning device of trapping in a vehicle, wherein the early warning device comprises a processor, a memory and a computer program which is stored in the memory and configured to be by the processor; and the processor performs the early warning method of trapping in the vehicle as claimed in claim 7 when implementing the computer program.

10. The early warning method as claimed in claim 6, wherein the method further comprises:
when the decrease of the bearing value of the seat is detected under the static state of the vehicle and the decreased number is greater than or equal to the second weight threshold, prompting the driver that the initial value will be updated and the bearing value of the seat should not be changed within the preset time period; and
when the initial value is updated successfully, informing the driver of successful updating of the initial value and a specific number of the initial value after the updating.

11. An early warning device of trapping in a vehicle, wherein the early warning device comprises a processor, a memory and a computer program which is stored in the memory and configured to be by the processor; and the processor performs the early warning method of trapping in the vehicle as claimed in claim 10 when implementing the computer program.

12. An early warning device of trapping in a vehicle, wherein the early warning device comprises a processor, a memory and a computer program which is stored in the memory and configured to be by the processor; and the processor performs the early warning method of trapping in the vehicle as claimed in claim 6 when implementing the computer program.

13. The early warning method as claimed in claim 1, wherein controlling the vehicle to give the trapping alarm signal when the weight difference is greater than or equal to the preset first weight threshold comprising:
controlling to turn on double flashing lights and honking a horn when the weight difference is greater than or equal to the preset first weight threshold.

14. An early warning device of trapping in a vehicle, wherein the early warning device comprises a processor, a memory and a computer program which is stored in the memory and configured to be by the processor; and the processor performs the early warning method of trapping in the vehicle as claimed in claim 13 when implementing the computer program.

15. The early warning, method as claimed in claim 1, wherein the method further comprises:
stopping sending the trapping alarm signal when unlocking or locking of the vehicle door is detected after sending the trapping alarm signal.

16. An early warning device of trapping in a vehicle, wherein the early warning device comprises a processor, a memory and a computer program which is stored in the memory and configured to be by the processor; and the processor performs the early warning method of trapping in the vehicle as claimed in claim 15 when implementing the computer program.

17. An early warning device of trapping in a vehicle, wherein the early warning device comprises a processor, a memory and a computer program which is stored in the memory and configured to be by the processor; and the processor performs the early warning method of trapping in the vehicle as claimed in claim 1 when implementing the computer program.

18. A computer readable storage medium, wherein the computer readable storage medium comprises a stored computer program, wherein a device where the computer readable storage medium is located is controlled to implement the early warning method of staying in the vehicle as claimed in claim 1 when the computer program runs.

* * * * *